United States Patent
Ma et al.

(10) Patent No.: US 10,320,870 B2
(45) Date of Patent: *Jun. 11, 2019

(54) METHOD AND APPARATUS FOR CARRIER CONTROLLED DYNAMIC RATE ADAPTATION AND CLIENT PLAYOUT RATE REDUCTION

(71) Applicant: Ericsson AB, Stockholm (SE)

(72) Inventors: Kevin J. Ma, Nashua, NH (US); Raj Nair, Lexington, MA (US); Robert Hickey, Bedford, MA (US); Jianguo Xu, Newton, MA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,858

(22) Filed: Dec. 17, 2014

(65) Prior Publication Data

US 2015/0106481 A1 Apr. 16, 2015

Related U.S. Application Data

(63) Continuation of application No. 13/667,268, filed on Nov. 2, 2012, now Pat. No. 8,918,535, which is a
(Continued)

(51) Int. Cl.
*H04L 29/08* (2006.01)
*H04L 29/06* (2006.01)
(Continued)

(52) U.S. Cl.
CPC .......... *H04L 65/60* (2013.01); *H04L 29/0809* (2013.01); *H04L 29/08099* (2013.01);
(Continued)

(58) Field of Classification Search
CPC ..... H04L 65/60; H04L 65/602; H04L 65/103; H04L 65/105; H04L 67/02;
(Continued)

(56) References Cited

U.S. PATENT DOCUMENTS 7,640,358 B2 12/2009 Deshpande
7,711,841 B2 5/2010 Deshpande
(Continued)

FOREIGN PATENT DOCUMENTS

WO WO 2010/108053 A1 9/2010
WO WO 2011/102791 A1 8/2011

OTHER PUBLICATIONS

Pantos, R.: "HTTP Live Streaming" draft-pantos-http-live-streaming-01. Internet Draft. Jun. 8, 2009.
(Continued)

*Primary Examiner* — Le H Luu

(57) ABSTRACT

A method and system is provided for controlling bandwidth rate limiting and client rendering rate limiting in a video delivery network. The method provides network service providers with a means for overriding video delivery data rates selected through dynamic client bitrate adaptation, as well as video data rendering rates of the clients, to limit the impact of network congestion. A system is also specified for implementing a client and a proxy computer in accordance with the method. The system works transparently with standard HTTP-based video delivery systems and includes an HTTP proxy cache infrastructure to support bandwidth rate limiting and client rending rate limiting. The system further provides for administrative overrides of client bitrate selection and client bandwidth usage.

20 Claims, 5 Drawing Sheets

Related U.S. Application Data continuation of application No. PCT/US2010/060317, filed on Dec. 14, 2010.

(60) Provisional application No. 61/330,971, filed on May 4, 2010, provisional application No. 61/389,408, filed on Oct. 4, 2010.

(51) Int. Cl.
*H04N 21/222* (2011.01)
*H04N 21/6405* (2011.01)
*H04N 21/647* (2011.01)

(52) U.S. Cl.
CPC .......... *H04L 65/103* (2013.01); *H04L 65/105* (2013.01); *H04L 65/602* (2013.01); *H04L 67/2842* (2013.01); *H04L 67/2847* (2013.01); *H04N 21/222* (2013.01); *H04N 21/6405* (2013.01); *H04N 21/64738* (2013.01); *H04L 67/02* (2013.01)

(58) Field of Classification Search
CPC ............. H04L 67/2842; H04L 67/2847; H04L 29/0809; H04L 29/08099; H04N 21/64738

See application file for complete search history.

(56) References Cited

U.S. PATENT DOCUMENTS

| | | | |
|---|---|---|---|
| 2003/0182437 A1 | 9/2003 | Kobayashi et al. | |
| 2004/0016000 A1* | 1/2004 | Zhang ................. | H04N 7/17354 725/143 |
| 2004/0174875 A1 | 9/2004 | Geagan, III et al. | |
| 2004/0186877 A1* | 9/2004 | Wang ................. | H04L 29/06027 709/200 |
| 2005/0111432 A1* | 5/2005 | Ekstrom ............. | H04L 65/4061 370/350 |
| 2006/0064500 A1 | 3/2006 | Roth et al. | |
| 2006/0095402 A1 | 5/2006 | Lee et al. | |
| 2006/0101224 A1* | 5/2006 | Shah ..................... | G06F 9/5077 711/173 |
| 2007/0162459 A1 | 7/2007 | Desai et al. | |
| 2007/0291744 A1* | 12/2007 | Lundberg ................ | H04L 47/25 370/352 |
| 2008/0140937 A1* | 6/2008 | Nalawade ........... | G06F 12/0871 711/119 |
| 2008/0165861 A1* | 7/2008 | Wen ..................... | H04N 19/139 375/240.26 |
| 2008/0195746 A1 | 8/2008 | Bowra et al. | |
| 2008/0200161 A1* | 8/2008 | Morse ............... | G06F 17/30867 455/418 |
| 2008/0207182 A1 | 8/2008 | Maharajh et al. | |
| 2008/0256254 A1 | 10/2008 | Kim et al. | |
| 2009/0099919 A1 | 4/2009 | Schiltheiss et al. | |
| 2009/0254657 A1* | 10/2009 | Melnyk ................... | H04L 47/10 709/224 |
| 2009/0310668 A1* | 12/2009 | Sackstein ......... | H04N 21/23435 375/240.01 |
| 2010/0153395 A1* | 6/2010 | Hannuksela ......... | G11B 27/102 707/737 |
| 2012/0047542 A1 | 2/2012 | Lewis et al. | |

OTHER PUBLICATIONS

Zambelli, Alex: "Alex Zambelli's Microsoft Media Blog, Microsoft Media Platform, streaming video, Smooth Streaming, H.264, VC-1, Silverlight, Windows Media". http://alexzambelli.com/blog/2009/02/10/smooth-streaming-architecture/.

Schulzrinne, et al.: "Real Time Streaming Protocol (RTSP)". Network Working Group, Request for Comments: 2326. Apr. 1998.

Schulzrinne, et al.: "RTP: A Transport Protocol for Real-Time Applications". Network Working Group, Request for Comments: 3550. Jul. 2003.

Huitema, C.: Real Time Control Protocol (RTCP) attribute in Session Description Protocol (SDP). Network Working Group, Request for Comments: 3605. Oct. 2003.

Apple: "HTTP Live Streaming Overview". Apple Developer. 2011.

"Dynamic stream switching with Flash Media Server 3", Adobe Developer Connection/Adobe Media Server Developer Center.

Westerlund, et al.: "SDP and RTSP extensions defined for 3GPP Packet-switched Streaming Service and Multimedia Broadcast/Multicast Service". Draft-westerlund-mmusic-3gpp-sdp-rtsp-07. Network Working Group, Internet-draft. May 8, 2009.

Rosenburg, et al.: "An RTP Payload Format for Generic Forward Error Correction". Network Working Group, Request for Comments: 2733. Dec. 1999.

Li, A.: "RTP Payload Format for Generic Forward Error Correction". Network Working Group, Request for Comments: 5109. Dec. 2007.

Li, et al.: "Content-Aware Playout and Packet Scheduling for Video Streaming over Wireless Links". Aug. 2008.

Kalman, et al.: "Adaptive Media Playout for Low-Delay Video Streaming Over Error-Prone Channels". Jun. 2004.

\* cited by examiner

METHOD AND APPARATUS FOR CARRIER CONTROLLED DYNAMIC RATE ADAPTATION AND CLIENT PLAYOUT RATE REDUCTION

PRIORITY

This application is a continuation application of pending U.S. patent application Ser. No. 13/667,268 filed Nov. 2, 2012, which is a national stage entry of International Application No. PCT/US2010/060317 filed on Dec. 14, 2010, which claim priority to U.S. Provisional Application No. 61/389,408 filed on Oct. 4, 2010 and U.S. Provisional Application No. 61/330,971 filed on May 4, 2010. The contents of U.S. patent application Ser. No. 13/667,268 are hereby incorporated by reference herein.

BACKGROUND

This invention relates in general to streaming media, and more specifically to client rendering rate control in a mobile carrier environment.

Available bandwidth in mobile carrier networks can vary widely. In densely populated areas, the number of subscribers connected to a single access point can reduce bandwidth allocations for all users. As mobile users are handed off between access points, sparse coverage, or dense population can affect bandwidth availability at any time. For streaming media, which require long lived connections, being able to adapt to the changing bandwidth can be advantageous. Though video bitrate adaptation is often used to combat bandwidth variations, short term fluctuations can also be addressed with playout rate adaptation.

SUMMARY

A mobile carrier network functioning as a video delivery network employs a proxy computer to enforce video streaming policies for clients using bitrate adaptation and video playout rate reduction. Among other functions, the proxy computer caches video segments from a video content server and delivers cached video segments to the clients, while monitoring a variety of operational information including subscriber service level agreement (SLA) information, local network bandwidth at the proxy computer, and presence of congestion in the network. The operational information is used to calculate desired operational parameters including a target optimal bitrate for delivery of the video segments and an optimal bitrate for prefetching and predictively prefetching future video segments. During operation, the clients are notified of network conditions and modifications to be made to the playout rate at which the video segments are to be rendered, to obtain a desired mix of quality playback and conformance to the desired operational parameters of the network.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
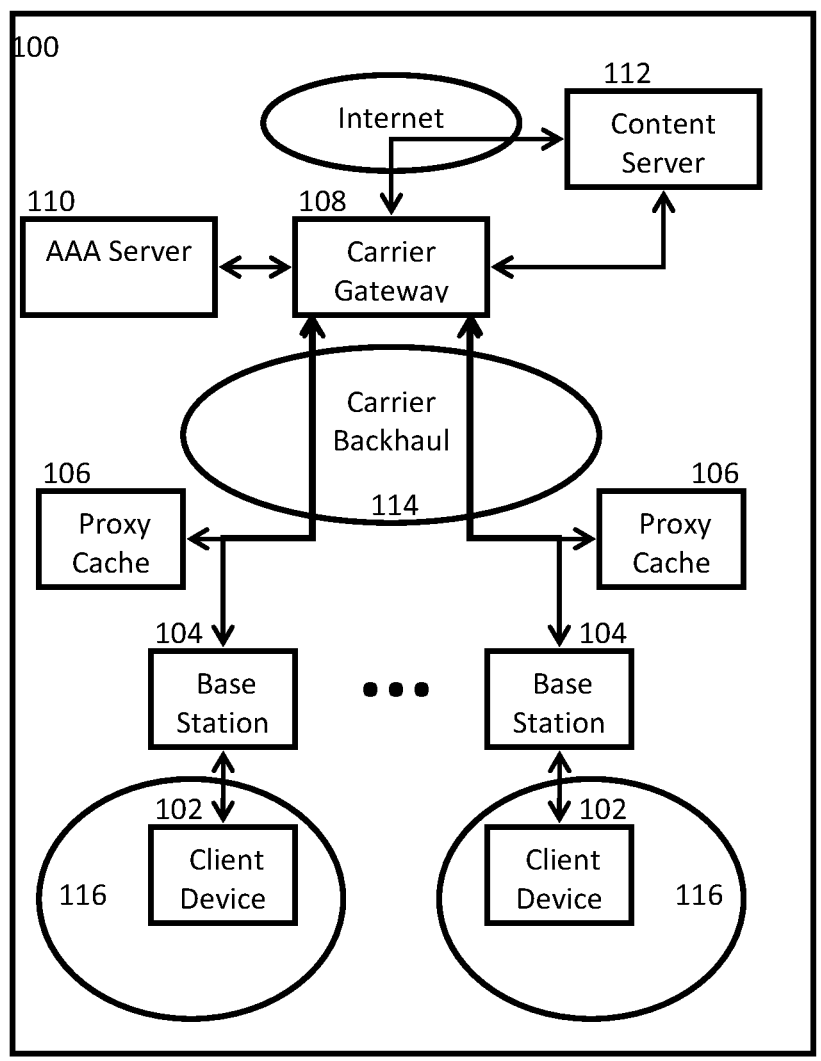
FIG. 1 is a block diagram of a system which is capable of conducting procedures, in accordance with various embodiments of the invention.

Methods and apparatus are disclosed for performing traffic management within a carrier network by controlling HTTP-based streaming video rate adaptation and initiating client playout rate limiting for streaming video, through the use of a proxy cache. Proxy caching is used within the carrier network to limit carrier backhaul network usage, to limit radio access network usage, and to decrease retrieval latency for clients. The proxy cache optimizes HTTP-based video streaming. HTTP-based video streaming schemes typically rely on segmented video formats. Segmented video takes full length video files and divides it into multiple smaller files, which, when played in succession, render the complete video. Video segments (referred to herein as segments) are typically on the order of seconds or tens of seconds in duration. There are multiple schemes for HTTP-based video streaming (e.g. HTTP Live Streaming, Silverlight Smooth Streaming, and other proprietary schemes), as should be known to those skilled in the art. Rate limiting policies can be applied to HTTP-based video streaming, with rate limiting being performed on a per segment basis.

HTTP-based streaming schemes can support bitrate adaptation by providing multiple versions of each segment and allowing clients to explicitly specify the version in the segment retrieval requests, where each version is encoded at a different bitrate. Client controlled rate adaptation, however, can only take into account localized bandwidth fluctuations. Greedy client controlled rate adaptation schemes can be detrimental to overall network health. The invention provides for carrier control over rate adaptation which allows for a more holistic approach to network management.

Rate adaptation is an important tool for managing network utilization, however, bitrate switching often involves latency which can cause playback interruptions. Bitrate switching is also sometimes overkill for short duration network interruptions. Bitrate switching can reduce quality for many tens of seconds or even minutes, while waiting for the rate adaptation algorithms to converge. Playout rate reduction offers an alternative for short-term rate adaptation. Playout rate reduction can use the existing data stream, but render it slower than intended to stretch out the data's useful wall clock duration. Stretching the useful duration of already buffered segments can provide a few seconds of margin for a network interruption to resolve itself, or to mask the latency of a bitrate switch, when used in conjunction with bitrate adaptation.

Deep stream inspection (DSI) is performed to classify video streaming sessions and recognize video delivery rate requested by the client. Because HTTP-based video streaming allows clients to request the video in segments using a plurality of requests, monitoring individual requests is insufficient for identifying HTTP-based video streaming sessions. Video sessions are recognized based on an initial HTTP request. In one embodiment, a playlist or manifest file is requested by the client to get a list of segments. In another embodiment, well formed URL and query strings are used to convey video information.

The DSI parses the initial requests and responses to glean information about the stream, and that information is used to create a session. In one embodiment, sessions are created for all requests. In another embodiment, sessions are only created for non-video content if the request if from a specific source or for a specific destination address. In another embodiment, sessions are only created for video content. In another embodiment, sessions are only created for popular video content. In one embodiment, content popularity is based on requests rate for the content.

Once the session is created and the streaming scheme is identified, segment prefetching may commence. Sessions are then associated with subscriber information provided by the carrier. The subscription information contains subscriber service level agreement (SLA) and rate limiting information. In one embodiment, the SLA is used to determine if the client session should be throttled back if the requested video delivery rate exceeds the purchased subscription. The SLA information may also be used for basic access control, if the subscriber has not purchased access to the content requested. In one embodiment, the subscription information may include resolution limits (e.g., only devices with resolutions less than 480×360). In another embodiment, the subscription information may include platform restrictions (e.g., only iOS devices, or only Android devices, or only Windows devices). In another embodiment, the subscription information may include make and model restrictions (e.g., only iPad or only HTC Desire HD). In another embodiment, the subscription information may include network restrictions (e.g., only 3G networks or only 4G networks). In one embodiment, sessions are only created for client devices whose platform conforms to the subscription restrictions. In one embodiment, sessions are only created for client devices whose network connectivity conforms to the subscription restrictions. In one embodiment, global rate limiting policies may be specified by the carrier. In one embodiment, the SLA is used to determine if the client's video streaming session is eligible for client playout rate reduction. In one embodiment, a list is kept of all clients accessing the proxy. The list is ordered based on the SLA information, where clients with a lower level of service are targeted for video rate adaptation and client playout rate reduction first.

In one embodiment, client segment requests are redirected by a proxy to a remote network location of the segment. In another embodiment, a local cache is used for storing retrieved segments. The segments are distributed from the local cache to the client. In one embodiment, segments are evicted from the cache based on popularity. In another embodiment, segments are evicted from the cache based on temporal locality. Because video segments are typically viewed in sequential order, temporal locality is an efficient metric, especially for live video streams that provide no support (or only limited support) for digital video recorder (DVR) functionality (e.g. pause and rewind). To support the near-live nature of HTTP video streams, a minimum backlog threshold is supported so that temporal eviction always keeps at least S seconds of data in the cache, where S is the threshold value. Intelligent cache prefetching for streaming video segments can also be used. Once a stream is initiated, sequential access to segments is expected, and future segments may be prefetched. Given the current known delivery rates, taking into account the current network load, the subscriber SLA, and the global policy settings, the likely target delivery rates may be inferred, and only those bitrates prefetched.

In one embodiment, segments are cached for use by clients and subsequent segments are prefetched for the requesting client. The proxy cache provides a method for differentiating between streaming methods and for recognizing client initiated rate adaptation schemes using URI signatures to recognize and parse HTTP-based video streaming requests. The proxy cache measures the backend carrier backhaul network bandwidth available for retrieving and prefetching segments, as well as measuring frontend radio access network (RAN) bandwidth available for delivering segments to the clients. When congestion occurs, the proxy cache can force video rate adaptation, disable segment prefetching, reduce client segment delivery rates, and notify clients to reduce their segment request rates and/or video rendering (playout) rates.

An HTTP server is used which services client requests for content. In one embodiment, non-video segment requests are transparently proxied. In another embodiment, non-video segment requests are redirected to a separate HTTP proxy. Requests for video segments are processed and both subscriber and global rate limiting policies are applied. Once a target bitrate (possibly lower than what the client requested) is determined for the response segment, the segment is served from the cache, if it is available. Alternatively, the request may be spoofed and proxied to a content server, i.e., a request for the target bitrate, rather than the requested bitrate (if they are different), is sent to the content server on behalf of the client. The segment retrieved from the content server is cached and sent to the client. In one embodiment, if the desired bitrate segment is not available in the cache, but a segment of a different bitrate is available in the cache, the cached segment may be used to respond to the client to reduce response latency, regardless of the bitrate of the cached segment. In one embodiment, prefetching of subsequent segments is initiated at this point for the target bitrate. In one embodiment, a threshold for maximum cache occupancy is maintained for each session.

In one embodiment, backend bandwidth is measured when proxying video segments. The time for retrieving the segment from the server is compared with the target segment duration to determine if sufficient bandwidth exists to retrieve that video. If the measured bandwidth is less than the target rendering bitrate plus some small percentage (e.g. 5%), then the client is signaled to reduce its playout rate. In one embodiment, frontend bandwidth is measured when proxying video segments. The time for delivering the segment to the client is compared with the target segment duration to determine if sufficient bandwidth exists to retrieve that video. If the measured bandwidth is less than the target rendering bitrate plus some small percentage (e.g. 5%), then the client is signaled to reduce its playout rate. In one embodiment, an additional carrier specified backend threshold is set, such that, if the estimated excess backend bandwidth on the backend network connection falls below the backend threshold, then the client is signaled to reduce its playout rate. In one embodiment, an additional carrier specified frontend threshold is set, such that, if the estimated excess frontend bandwidth on the radio network connection falls below the frontend threshold, then the client is signaled to reduce its playout rate. The following pseudo-code shows an example of this algorithm:

```
integer frontend_threshold
integer frontend_bandwidth_estimate
integer backend_threshold
integer backend_bandwidth_estimate
integer segment_download_time
integer segment_delivery_time
integer segment_duration
if (frontend_bandwidth_estimate < frontend_threshold ||
   backend_bandwidth_estimate < backend_threshold) {
   signal_client_playout_rate_reduction
} else if (segment_download_time > segment_duration * 0.95) {
   signal_client_playout_rate_reduction
   reduce_segment_prefetching_rate
} else if (segment_delivery_time > segment_duration * 0.95) {
   signal_client_playout_rate_reduction
   enforce_segment_prefetching_cache_occupancy_limit
}
```

In one embodiment, the bandwidth estimates are based on the client interpretation of the available bandwidth, as communicated through a bitrate adaptation request. In one embodiment, the algorithm also includes checks to verify that the resolution of the selected bitrate video does not exceed subscription resolution limits.

DESCRIPTION OF ILLUSTRATIVE EMBODIMENTS

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In FIG. 1 is a block diagram 100 for one embodiment of the present invention. It shows a typical mobile carrier network starting at the mobile carrier gateway (referred to herein as a gateway) 108 which fans out to a plurality of base stations 104 over a mobile carrier backhaul network 114. The gateway 108 moderates access between the internal carrier network and the public internet. The gateway 108 is also responsible for managing access to the network by mobile client devices 102. The base stations 104 provide client devices 102 with access via a radio access network (RAN) 116.

When a client device 102 wishes to connect to a base station 104 over the RAN 116, a registration request is first sent to the gateway 108, which contacts an authentication, authorization, and accounting (AAA) server 110 to verify the subscriber information associated with the client device 102. The subscriber information includes access controls, bandwidth SLA information, device policy information, as well as content and service subscriptions that have been purchased and associated with the client device 102.

The diagram shows the content server 112 which represents a server containing video content. In one embodiment, the content server 112 is part of a carrier walled garden and may be directly accessed by the gateway 108 through the carrier network. In another embodiment, the content server 112 is part of a content delivery network (CDN) or is hosted independently by the content provider, which the gateway 108 must access over the public Internet.

The diagram also shows the placement of a proxy cache 106 which sits in-line between the base station 104 and the carrier backhaul network 114 so that it can monitor both the backend carrier backhaul network 114 bandwidth as well as the frontend base station radio access network 116 bandwidth. In one embodiment the proxy cache 106 is implemented as a stand-alone server with a processor and memory for running specialized software implementing functionality for various foreseeable embodiments of the present invention. The proxy cache 106 implements content caching and performs deep stream inspection (DSI) to identify and classify streaming video sessions. The proxy cache 106 further provides bandwidth monitoring and client playout rate reduction control for streaming video sessions.

In one embodiment, all requests are routed through the proxy cache 106. The proxy cache 106 transparently proxies non-HTTP requests. In another embodiment, only content requests in (e.g., only HTTP requests, or requests on specific TCP destination ports) are routed through the proxy cache 106. When the client device 102 is granted access to the carrier network, it issues a request for content. The request is routed from the base station 104 to the gateway 108 (through the proxy cache 106), and on to the content server 112. If multiple requests for the same content are initiated by a plurality of client devices, multiple connections between client devices 102 and the content server 112 are created. The backhaul network can become unnecessarily overloaded with duplicate data being sent to support the plurality of client devices 102. The proxy cache 106 alleviates this congestion in the backhaul network 114 and limits load on the gateway 108 by caching data closer to the base stations 102. If the content exists in the proxy cache 106, it is served directly from the cache to the client device 102. Otherwise, the request is forwarded to the gateway 108 and on to the content server 112. The response is returned through the proxy cache 106 where it is cached for use in servicing future requests.

When the mobile client device 102 connects to the mobile carrier base station 104, the base station 104 contacts the gateway 108 to verify subscriber access. The gateway 108 contacts the AAA server 110 to verify the subscriber information and returns that information to the base station 104. The subscriber information includes bandwidth SLA information and device policy information. In one embodiment, the subscriber information is provided to the proxy cache 106 by the base station 104. In another embodiment, the proxy cache 106 requests subscriber information from the AAA server 110 directly when a client device 102 issues a content request. When the client device 102 issues an HTTP request for content, the base station 104 routes all HTTP requests through the proxy cache 106. The proxy cache 106 classifies the request through DSI comparing it to known HTTP-based video streaming protocol signatures. In one embodiment, the signature comparison checks for requests of video segment playlists or manifest files. In another embodiment, the signature comparison checks for known segment retrieval URI formats. In another embodiment, the signature comparison checks for known segment retrieval query string formats.

In one embodiment, if a video streaming request is detected, a video streaming session is created. In another embodiment, if a video streaming request is detected, a popularity check is performed to see if a session should be created. If the popularity exceeds a minimum popularity threshold, a session is created. In one embodiment, the proxy cache 106 maintains a hit rate count for video requests to determine popularity. In one embodiment, a client device 102 platform check is performed to see if a session should be configured. Sessions are only created for client device 102 platforms which are on an approved platform list. In one embodiment, a client device 102 make and model check is performed to see if a session should be configured. Sessions are only created for client device 102 makes and models which are on an approved make and model list. In one embodiment, a client device 102 network connectivity check is performed to see if a session should be configured. Sessions are only created for client devices 102 which connect using an approved network technology. The session stores information gleaned from the initial request to aid in identifying future requests which belong to the same session.

In one embodiment, if the playlist or manifest file does not already exist in the cache, or if the playlist is a live real-time updated playlist that needs refreshing, the proxy cache 106 proxies the playlist or manifest file request to the content server 112 and caches the response. In one embodiment, if the playlist or manifest file already exists in the cache, and has not expired and is not for live video, the already parsed and cached video information is used. In one embodiment, a playlist or manifest file is parsed to glean segment URL prefixes. In another embodiment, the URI is parsed to glean segment URL prefixes. In one embodiment, the proxy cache 106 recognizes m3u8 playlists. The master m3u8 playlists are used to glean the available bitrates and the individual bitrate playlists are used to glean the segment locations and naming convention. In another embodiment, the proxy cache 106 recognizes Silverlight manifest file playlists. The bitrate attributes of the Silverlight manifest is used to glean the available bitrates. In another embodiment, the proxy cache 106 recognizes Flash media manifest file playlists. The bitrate attributes of the Flash manifest are used to glean the available bitrates and the URL attributes are used to determine media locations. In another embodiment, the proxy cache 106 recognizes custom XML playlists.

There are many existing virtual playlist schemes, and may ways to implement alternate video playlist schemes, as should be known to those skilled in the art. Any of those virtual playlist methods would be suitable for generating a signature for that playlist format and inclusion in the proxy cache 106 for session classification. In one embodiment, the proxy cache 106 supports proxying HTTPS connections for playlist requests. The SSL/TLS encrypted playlist request from the client 102 is terminated by the proxy cache 106 and issues a spoofed backend HTTPS request to the content server 112 to retrieve the up-to-date playlist.

HTTP-based video streaming schemes require the client 102 to issue a plurality of subsequent requests for additional segment files to retrieve additional video data to render. These requests, which are routed through the proxy cache 106, by the base station 104, are classified through DSI and found to match existing video streaming sessions created through previous requests. Retrieved video segments are cached in the proxy cache 106, and future segments are prefetched based on the current segment bitrate. In one embodiment, the proxy cache 106 prefetches the next segment of the same bitrate. In another embodiment, the proxy cache 106 prefetches the next segment for a higher bitrate if excess bandwidth exists and the client 102 SLA allows for it. In another embodiment, the proxy cache 106 prefetches the next segment for a lower bitrate if network congestion is detected. In one embodiment, the segment bitrate is determined from the URL by matching it to information in the playlist or manifest file. In another embodiment, the segment bitrate is determined from the segment file name. In another embodiment, the segment bitrate is determined from the query string parameters in the request from the client 102. The bitrate is also used to determine if playout rate reduction should be enforced. In one embodiment, the segment bitrate must also take into account the video resolution of the video encoded at that bitrate. If the resolution exceeds a maximum resolution as set by the carrier either globally or through the subscription or SLA information, that bitrate must be excluded from selection.

Upon processing each segment request, the proxy cache 106 checks to see if the carrier has set any global rate limiting policies for either the carrier backhaul network 114 or the radio access network 116. The proxy cache 106 compares the backhaul network 114 excess bandwidth estimates and the radio access network 116 excess bandwidth estimates with the minimum excess bandwidth thresholds set by the carrier. The following pseudo-code shows an example of this algorithm:

```
integer frontend _threshold
integer frontend_bandwidth_estimate
integer backend_threshold
integer backend_bandwidth_estimate
if (frontend_bandwidth_estimate < frontend_threshold ||
   backend_bandwidth_estimate < backend_threshold) {
   signal_client_playout_rate_reduction
}
```

If either threshold has been violated, a notification is sent to the client device 102, with the segment, instructing it to reduce its playout rate. In one embodiment, the notification is sent in-band, via a custom HTTP header. In another embodiment, the notification is sent out of band through a separate control channel. In one embodiment, bandwidth estimates are provided to the proxy cache 106 by the base station 104. In another embodiment, bandwidth estimates are retrieved by the proxy cache 106 from the base station 104, e.g., using SNMP to retrieve RMON statistics. In another embodiment, the bandwidth estimates are calculated by the proxy cache 106 based on segment download times. The segment size divided by the segment retrieval time gives a bandwidth estimate for the carrier backhaul network 114. Though the segment retrieval time may be influenced by congestion in the public internet, this just allows the carrier backhaul network 114 usage to be optimized for end-to-end delivery. Similarly, the segment size divided by the segment delivery time gives a bandwidth estimate for the local radio access network 116. The following pseudo-code shows an example of this algorithm:

```
integer frontend_bandwidth_estimate
integer backend_bandwidth_estimate
integer segment_delivery_time
integer segment_retrieval_time
integer segment_size
frontend_bandwidth_estimate = segment_size / segment_delivery_time
backend_bandwidth_estimate = segment_size / segment_retrieval_time
```

In one embodiment, client playout rate reduction is limited to specific SLA levels. There may be multiple backend and frontend minimum bandwidth thresholds for the carrier backhaul and radio access networks 114 and 116, respectively. For example, there could be one threshold for each service level (e.g., silver, gold, platinum); the higher the service level, the lower the threshold. In this case, the proxy cache 106 looks up the service level for the client device 102, and uses the corresponding bandwidth thresholds for that service level. The following pseudo-code shows an example of this algorithm:

```
integer frontend_threshold
integer backend_threshold
integer customer_service_level
frontend_threshold =
get_frontend_threshold(customer_service_level)
backend_threshold =
get_backend_threshold(customer_service_level)
```

In one embodiment, when the frontend RAN 116 bandwidth is the reason for playout rate reduction, the segment returned in the HTTP response is also replaced with a lower bitrate version of the segment. The proxy cache 106 checks the cache to see if a corresponding segment exists. In one embodiment, lower bitrate segments are identified based on the URL prefixes gleaned from the playlist or manifest files. In another embodiment, lower bitrate segments are identified based on segment file names. If a lower bitrate version of the segment file exists, it may be substituted to reduce delivery bandwidth requirements. Client playout rate reduction is still used to reduce segment playout and therefore segment request rate.

In one embodiment, when playout rate reduction is in effect, the segment prefetching is disabled. In another embodiment, when playout rate reduction is in effect, the segment prefetching continues, however, lower bitrate segments are retrieved and used to service subsequent segment requests from the client device 102. In one embodiment, the proxy cache 106 retrieves the lowest possible bitrate for the media, in order to achieve the fastest reduction in bandwidth usage. In another embodiment, the proxy cache 106 retrieves the next lower bitrate for the media, in order to minimize playback continuity disruption. In another embodiment, the proxy cache 106 retrieves the highest possible bitrate which is below the bandwidth estimate, in order to maintain network usage optimality. In one embodiment, lower bitrate segments are identified based on the URL prefixes gleaned from the playlist or manifest files. In another embodiment, lower bitrate segments are identified based on segment file names.

If the HTTP request is not for streaming video the request is forwarded to the gateway 108. In one embodiment, the non-video request is proxied by the proxy cache 106 and the content may be cached. In another embodiment, the non-video request is redirected to the gateway 108 such that the response will not traverse the proxy cache 106. The gateway 108 routes the request to the content server 112, performing network address translation (NAT) as required.

Backhaul networks 114 are typically closed networks which support multicast distribution of data. In one embodiment, the proxy cache 106 may request that responses from the content server 112 be multicast by the gateway 108 to multiple geographically adjacent proxy caches 106. In one embodiment, the streaming proxies 106 are co-located with the base stations 104. The base stations 104 have known geographic relationships to each other. The proxy caches 106 join multicast groups based on these known geographic relationships in order to receive multicast distribution of segments based on geographic locality. In another embodiment, each proxy cache 106 services multiple base stations 104 where all base stations associated with a given proxy cache 106 share geographic locality. Given client devices 102 that are mobile, the client devices 102 may be handed off to different base stations 104 at any time. It is probable that the client device will be handed off to base stations 104 that are geographically adjacent to the current base station 104. In one embodiment, only prefetched segments are requested to be multicast to geographically adjacent streaming proxies 106. In another embodiment, both the initially requested segments as well as the prefetched segments are requested to be multicast to geographically adjacent streaming proxies 106.

Figure 2:
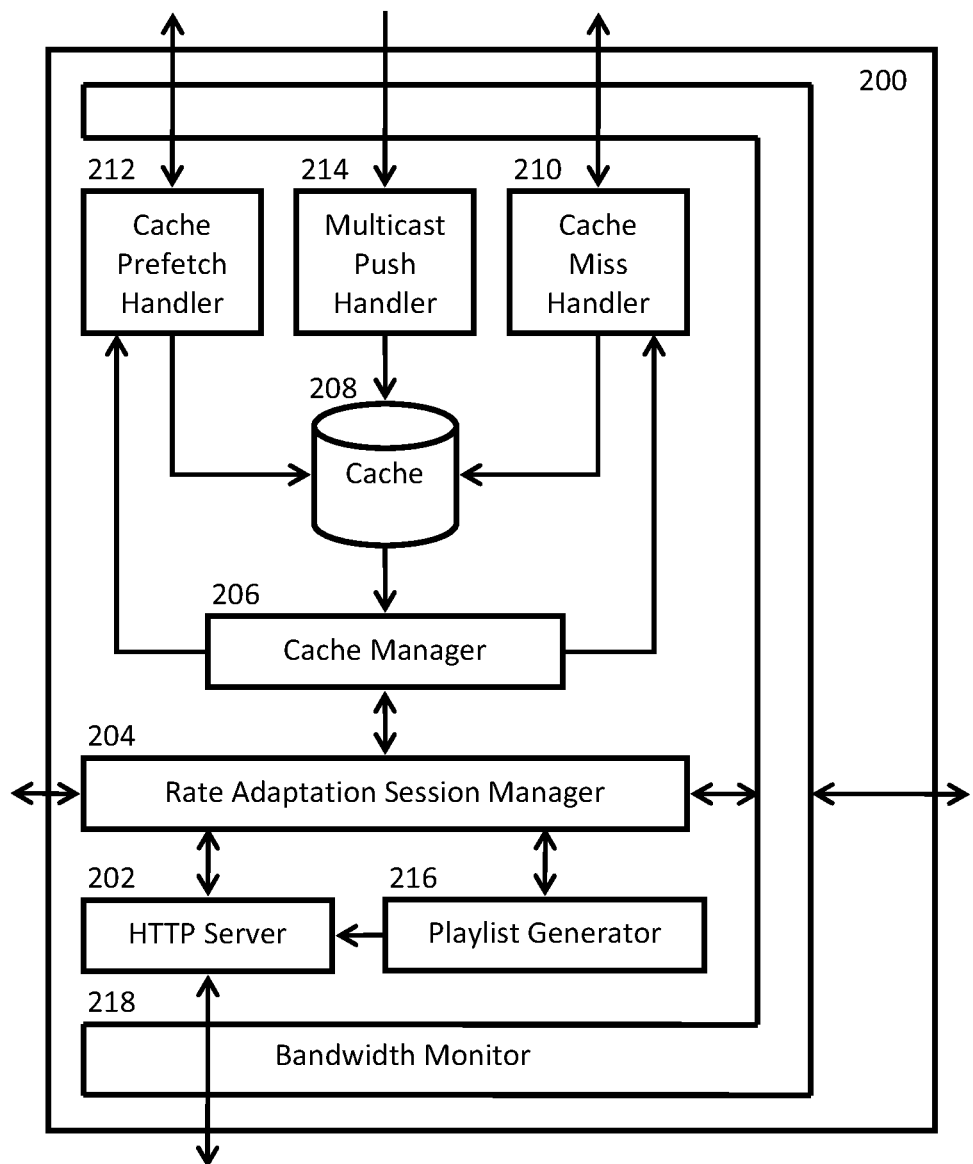
FIG. 2 is a diagram of an HTTP streaming video proxy cache with carrier controlled rate adaptation and playout rate reduction, in accordance with various embodiments of the present invention.

FIG. 2 is a diagram 200 of the components of the proxy cache 106. The HTTP server 202 handles protocol parsing. The rate adaptation session manager (referred to herein as a session manager) 204 is responsible for DSI and both the creation of video streaming sessions, and the mapping of requests to existing video streaming sessions. The session manager 204 is also responsible for maintaining subscriber rate limit, subscription restriction, and global rate limit and policy information. The cache manager 206 is responsible for keeping track of what is in the cache 208 and evicting items from the cache 208 when necessary. In FIG. 2, the cache 208 is understood to include physical disks or other storage devices used to store data. The cache miss handler 210 is responsible for proxying requests for content not found in the cache 208. The cache prefetch handler 212 is responsible for the preemptive prefetching of sequential video segments. In one embodiment, segments are prefetched continuously, using time intervals based on the known duration of the segments. For live streaming video, continuous retrieval is critical for interruption-free video delivery. In another embodiment, only the next sequential segment is prefetched when a segment is requested. For video on demand (VoD), playback is often discontinued abruptly, and on-demand prefetching is more efficient. The multicast push handler 214 is responsible for registering with the proper multicast groups and handling segments which have been pushed via multicast from the gateway 108. The playlist generator 216 is responsible for creating "spoofed" playlists or manifest files to present to client devices 102 (as described below). The bandwidth monitor 218 monitors all traffic into and out of the proxy cache 106. It measures the retrieval times for segments and other content from the content server 112 as well as the delivery times for the segments and other content to the client device 102. In one embodiment, the bandwidth monitor 218 also communicates with other network devices (e.g., via SNMP) to gather additional network bandwidth information. The bandwidth monitor 218 provides this information to the session manager 204 so that it may be used in rate limiting and determining target bitrates for sessions.

Requests from the client device 102 are received by the HTTP server 202 in the proxy cache 106 after being routed by the base station 104. In one embodiment, the base station 104 recognizes HTTP traffic based on the TCP port (e.g., ports 80, 8080, and 443). In another embodiment, the base station 104 recognizes HTTP traffic through deep packet inspection of the TCP flow (e.g., checking for HTTP headers in the TCP payload). In another embodiment, the base station 104 just sends all traffic to the proxy cache 106, and relies on the proxy cache 106 to redirect or proxy non-HTTP requests to the gateway 108. The HTTP server 202 terminates the HTTP connection from the client device 102, and the session manager 204 parses the request URI. The session manager 204 creates video sessions, maps segment requests to existing video sessions, or determines a request to be non-video related and proxies or redirects the request.

In one embodiment, sessions are created for all requests. In another embodiment, sessions are only created for non-video related requests if the source or destination addresses are well known. In another embodiment, sessions are only created for video related requests. In another embodiment, sessions are only created for popular video related requests. In one embodiment, video popularity is based on requests rate for the video as observed by the proxy cache 106. In one embodiment, sessions are only created for client devices 102 whose platforms are on an approved platform list. In one embodiment, sessions are only created for client devices 102 whose make and model are on an approved make and model list. In one embodiment, sessions are only created for client devices 102 whose network connection is through an approved network technology. In one embodiment, non-video related requests (e.g., standard Web page requests) are redirected to the gateway 108. In another embodiment, non-video related requests are processed by the proxy cache 106.

For non-video sessions (e.g., standard Web page requests), the session manager 204 creates a simple TCP-based flow using a standard 5-tuple (source IP address, destination IP address, source TCP port, destination TCP port, and protocol) for tracking the request. For video sessions, since multiple HTTP requests will be received from the client (one request per segment), TCP-based flow tracking is not sufficient. A streaming session is created using the subscriber information for the client device 102, the location of the video segments, previous video segment request history, and temporal locality of requests. Subscriber information and video segment location alone may not be sufficient, as the video may be a mash up of multiple video sources. Video segment requests are further processed by the session manager 204 to determine the target bitrate and the target segment to be returned to the client device 102. In one embodiment, the video resolution is also considered when selecting the target bitrate. A maximum resolution check is used to screen for valid target bitrates. The cache manager 206 checks the cache 208 for the video or non-video related content requested. If the content exists in the cache 208, it is returned to the client device 102. If the content does not exist in the cache 208, the cache miss handler 210 is instructed to retrieve the content from the content server 112. For video segment requests, the cache prefetch handler 212 may also be instructed to begin prefetching subsequent video segments.

The session manager 204 is responsible for managing subscriber information and retrieving the subscriber information if it is not already available. In one embodiment, the subscriber information is pushed to the proxy cache 106 by the base station 104 when the client device 102 is granted access to the network. Client devices 102 cannot connect to just any cellular network. Access control is performed by each base station 104. The unique identifier of the client device 102 must either be verified with the AAA server 110 each time the client device 102 is associated with a new base station 104 or the client device 102 must be registered with the new base station 104 through the hand-off process. In another embodiment, the proxy cache 106 requests the subscriber information directly from the AAA server 110 using a standard protocol and API (e.g. RADIUS or DIAMETER) or through a proprietary API over a standard protocol (e.g. XML Web Service). Different subscriber SLA information may be associated with the network depending upon whether it is the home network of the client device 102 or if the client device 102 is roaming.

The session manager 204 also maintains an API for the carrier to push subscriber information or global rate limiting policies to the proxy cache 106. In one embodiment, the proxy cache 106 provides a RESTful HTTP-based API for setting subscriber information and a separate RESTful HTTP-based API for setting global rate limiting information. The API allows specifying a policy group and a rate limit or SLA. The policy group could be an individual user ID, a service level ID (e.g. gold/silver/bronze), a media ID, a media group ID (e.g. channel name), or the global policy ID, specified in the RESTful URI. Either a numeric rate limit value is specified as part of the RESTful URI, or an SLA in a known XML format is specified in the entity body.

The API allows for proactive synchronization of policy database information between the carrier subscriber management system and the proxy cache 106. In one embodiment, subscriber information may include a bandwidth limit. In one embodiment, the subscriber information may include media or media channel subscription information. In another embodiment, the subscriber information may include a service level for which a global rate limit may be applied. In one embodiment, the global rate limiting policy may include a bandwidth limit applied to all sessions on the proxy cache 106. In another embodiment the global rate limiting policy may include a bandwidth limit applied to all sessions on the proxy cache 106 within a service level. In another embodiment the global rate limiting policy may include a bandwidth limit applied to a specific media or media channel. In another embodiment, the global rate limit policy may include a global minimum bandwidth requirement for the backend carrier backhaul network 114. In another embodiment, the global rate limit policy may include a per service level minimum bandwidth requirement for the backend carrier backhaul network 114. In another embodiment, the global rate limit policy may include a per subscriber minimum bandwidth requirement for the backend carrier backhaul network 114. In another embodiment, the global rate limit policy may include a per media or per media channel minimum bandwidth requirement for the backend carrier backhaul network 114. In another embodiment, the global rate limit policy may include a global minimum bandwidth requirement for the frontend radio access network 116. In another embodiment, the global rate limit policy may include a per service level minimum bandwidth requirement for the frontend radio access network 116. In another embodiment, the global rate limit policy may include a per subscriber minimum bandwidth requirement for the frontend radio access network 116. In another embodiment, the global rate limit policy may include a per media or per media channel minimum bandwidth requirement for the frontend radio access network 116.

For playlist or manifest-based schemes, video sessions may be created when the playlist or manifest is requested, and the playlist or manifest response may be parsed to determine what bitrates are available for the requested video. The playlist or manifest file typically specifies the different bitrates available for retrieval. The available bitrates are used to determine the best bitrate to use when applying rate limiting policies. In one embodiment, the playlist or manifest that is returned to the client device 102 is not the playlist or manifest that was retrieved from the content server 112. In one embodiment, bitrates which have been deemed too high for current network conditions, or that exceed the global rate limiting policies may be omitted from the playlist returned to the client 102. In another embodiment, bitrates may be reordered to suggest the starting bitrate to the client 102. In one embodiment, the highest bitrate below the current bandwidth estimate is suggested as the starting bitrate to provide the highest quality initial playback. In another embodiment, the lowest bitrate is suggested as the starting bitrate to minimize the retrieval latency and provide the fasted possible initial playback. In one embodiment, a playlist or manifest that contains only a single bitrate may be generated by the playlist generator 216. The single bitrate playlist identifies the proxy cache 106 as the location for the segments, allowing the proxy cache 106 to make the target bitrate determination at the time the segment is requested. This prevents client-side rate adaptation schemes from attempting to switch to a bitrate which exceeds the subscriber's SLA or the global rate limiting policies.

Once the session is created, the session manager 204 queries the cache manager 206 to retrieve the content from the cache 208. The content may be non-video content, a video playlist or manifest file, or a video segment. The cache manager 206 is responsible for keeping track of what is in the cache 208, what should be fetched or prefetched and added to the cache 208, as well as what should be evicted from the cache 208 and when eviction should occur. If the content exists in the cache 208, it is returned either to the session manager 204 which passes it to the HTTP server 202, or it is returned directly to the HTTP server 202 to be delivered to the client device 102. In one embodiment, playlist and manifest files should be returned to the session manager 204 for further parsing and video session creation while non-playlist or manifest files may be directly returned to the HTTP server 202. In another embodiment, all content is returned through the session manager 204 for session accounting purposes.

If the content does not already exist in the cache 208, the cache manager 206 issues a request for the content via the cache miss handler 210. In one embodiment, the cache miss handler 210 sends a request for content to the gateway 108 which gets forwarded to the content server 112. In another embodiment, content requests are also sent to neighboring proxy caches 106. Upon receiving the response, the cache miss handler 210 places the content in the cache 208 and notifies the cache manager 206. The content is then returned to the session manager 204 and passed to the HTTP server 202 to be delivered to the client device 102. In one embodiment, if the content is non-video content, then it is immediately evicted from the cache 208 by the cache manager 206. In another embodiment, the least recently used (LRU) non-video content is always evicted first. In another embodiment, popularity-based eviction is employed which does not necessarily evict non-video content first. For the popularity-based eviction scheme, video segments from live or near-live streams which will never be accessed again should be evicted first. If no live or near-live evictable content exists, less popular content should be evicted first. In one embodiment, popularity is based on a weighted request frequency, where more recent requests are given a higher weight. In another embodiment, popularity is based on values explicitly set by the carrier. Less popular content, even for currently streaming sessions, may be evicted as long as the content has already been delivered to all active streaming sessions. Prefetched and multicast push content which has not been played out yet is considered to have infinite popularity.

In one embodiment, when video segment data is requested, the HTTP server 202 forwards the request to the session manager 204 who checks if the bitrate of the requested segment matches the bitrate of the previously requested segment. If the bitrate is the different, the session is updated. If the bitrate is lower than the previously requested bitrate, then congestion may be inferred and should be noted. If the bitrate is higher than the previously requested bitrate, then the new bitrate must be evaluated based on the global rate limiting and the per subscriber and per media rate limiting policies. Regardless of whether or not the bitrate changed, the minimum bandwidth policies should be re-evaluated and enforced on each request.

Once the target bitrate has been chosen, the session manager 204 asks the cache manager 206 to check and see if the next sequential segments for that bitrate are available in the cache 208. If the segments are not in the cache 208, then the cache manager 206 issues a request to the cache prefetch handler 212 to get the next sequential segments. A threshold for the maximum number of segments to prefetch is maintained by the cache manager 206. In one embodiment, the prefetching threshold is measured in rendering duration and the number of segments is determined by the segment duration. In another embodiment, the prefetching threshold is measured in cache occupancy and the number of segments is determined by the size in bytes of the segments. In one embodiment, the cache prefetch handler 212 sends a request for content to the gateway 108 which gets forwarded to the content server 112. In another embodiment, the cache prefetch handler 212 also sends a request to the neighboring proxy caches 106. Upon receiving the response, the cache prefetch handler 212 places the content in the cache 208 and notifies the cache manager 206. The cache manager 206 performs cache eviction as necessary.

In one embodiment, if the session manager 204 has to enforce any global rate limiting policies, the client 102 is notified to begin playout rate reduction to reduce load on the network. In one embodiment, if the session manager 204 detects any client enacted rate adaptation, the client 102 is notified to begin playout rate reduction to increase prefetching time and reduce load on the network. In one embodiment, the session manager 204 instructs the HTTP server 202 to insert a custom HTTP header to indicate that client playout rate reduction is in force.

In one embodiment, segments of a video are prefetched according to an a priori configured schedule. The proxy cache 106 maintains a schedule of programmed content. In one embodiment, the proxy cache 106 and content server 112 are time-synchronized via a separate mechanism such as the network time protocol (NTP). This is particularly useful for distribution of real-time streams such as live events or for (pre-positioning of) popular pre-recorded content such as TV shows.

In one embodiment, the HTTP server 202 delivers the video segment data to the client device 102 in a paced manner. The data is paced at the segment bitrate. The segment bitrate is the bitrate at which the segment is encoded, which should be less than or equal to the target bitrate. For media players that measure bandwidth in order to perform client-side bitrate adaptation, sending data at the target bitrate will limit the media player's desire to switch to a bitrate which exceeds the subscriber's SLA or the global rate limiting policies. An example of a suitable adaptive HTTP streaming server to perform paced delivery is described in PCT Application No. PCT/US09/60120 filed Oct. 9, 2009 and entitled, Method And Apparatus For Efficient HTTP Data Streaming.

In one embodiment, the proxy cache 106 requests that video segments be multicast by the gateway 108 to multiple streaming proxies 106. In one embodiment, the gateway 108 multicasts through a plurality of intermediate distribution nodes which then multicast to the proxy caches 106. In one embodiment, the proxy cache 106 requests that video segments be unicast by the gateway 108 to multiple proxy caches 106. In one embodiment, the gateway 108 unicasts through a plurality of intermediate distribution nodes which then unicast to the proxy caches 106. Note that the rest of the discussion applies to the gateway 108 or distribution nodes interchangeably with respect to the distribution of content to the proxy caches 106. The multicast push handler 214 is responsible for receiving these unsolicited distributions of content. The multicast push handler 214 is responsible for joining the proper multicast trees within the carrier backhaul network 114. The multicast trees are differentiated by IP multicast group ids which may correspond to different channels (in the case of real-time streams) and different bitrates, or to different geographic locations.

Multicast delivery requires a non-stateful transport protocol like UDP, as should be known to those skilled in the art. As such, the reliable data delivery provided by stateful protocols like TCP is not available. In one embodiment, the multicast push handler 214 supports forward error correction (FEC). There are many network data coding schemes which may be used to implement FEC, as should be known to those skilled in the art. Any representative scheme should be applicable. The multicast push handler 214 is responsible for verifying received content and applying FEC where necessary.

In one embodiment, if FEC is not sufficient for recovering the data or if packet loss is detected, negative acknowledgements (NACK) are used to request retransmission of data from the gateway 108. The NACKs are sent via a separate TCP control channel back to the sender. The multicast push handler 214 is responsible for detecting packet loss and issuing NACKs. There are many methods for detecting packet loss, as should be known to those skilled in the art. Any representative scheme should be applicable. Packet loss rates may be used to estimate congestion in the multicast network. In one embodiment, the gateway 108 may monitor NACK rates to determine when to reduce multicast load. In another embodiment, when congestion occurs, special NACKs may be sent to the gateway 108 to notify it to reduce multicast load. In another embodiment, multicast push handler 214 may resign from one or more multicast trees when congestion is detected, to reduce load on the local proxy cache 106.

In one embodiment, the priority of the multicast trees is set by the carrier and lower priority trees are resigned from first. In another embodiment, multicast trees for higher bitrates should be resigned from first, as they have the most impact on network load. Once data is received by the multicast push handler 214, it reassembles the video segment files from the packetized multicast data. The reconstituted files are placed into the cache 208 by the multicast push handler 214 which then notifies the cache manager 206. The cache manager 206 performs cache eviction as necessary. These rules may be based on a content-priority policy as indicated by a cache policy manager at the gateway 108 where the policy itself may be based on content-licensing such as take-down rules, featured content placement, as well as content-usage such as most-popular, etc. The eviction rules help control cache storage requirements.

In one embodiment, prefetching of video segments according to an a priori configured schedule may be preempted by pre-scheduled multicast push. This is particularly useful for distribution of real-time streams such as live events or for (pre-positioning of) popular pre-recorded content such as TV shows. In one embodiment, the proxy cache 106 may subscribe to real-time or live streaming push preload multicast trees. The client device 102 would be made aware of activation and deactivation times for the content with the multicast push occurring before the activation time.

Figure 3:
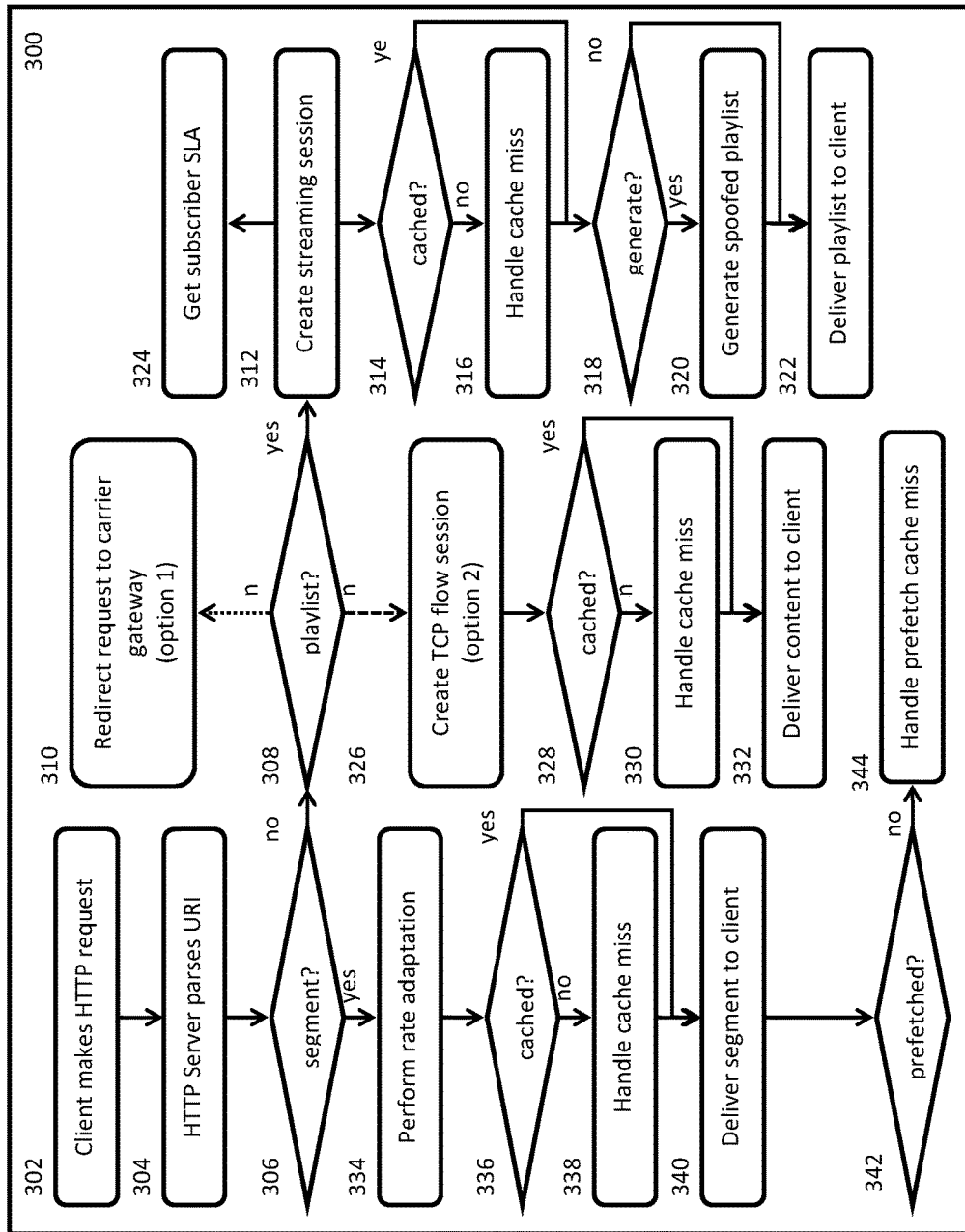
FIG. 3 is a flow chart showing a method for performing carrier controlled rate adaptation, in accordance with an embodiment of the present invention.

FIG. 3 is a flow chart 300 describing the process of servicing an HTTP video streaming session in accordance with various embodiments of the present invention. In step 302, the client device 102 makes an HTTP request for content. The request is received by the HTTP server 202 and processed in step 304. In step 306, the HTTP server 202 parses the request URI and checks to see if the request is for a video segment. If the request is for a video segment, processing continues to step 334 where the session manager 204 performs bitrate adaptation (explained in more detail below). If the request is not for a video segment, processing continues to step 308 where the HTTP server 202 checks to see if the request is for a video playlist or manifest file. If the request is for a video playlist or manifest, processing continues to step 312 where the session manager 204 creates the video streaming session (explained in more detail below). In one embodiment, if the request is not for a video playlist or manifest, processing continues to step 310 where the request is redirect to the gateway 108. In another embodiment, if the request is not for a video playlist of manifest, processing continues to step 326 for cache retrieval (explained in more detail below).

In step 312, a video playlist or manifest request has been detected. A streaming session is created for the client device 102. In one embodiment, a platform check is performed to ensure that the client device 102 is a whitelisted or non-blacklisted platform. In one embodiment, a make and model check is performed to ensure that the client device 102 is a whitelisted or non-blacklisted make and model. In one embodiment, a network check is performed to ensure that the client device 102 is connecting through a whitelisted or non-blacklisted network. In one embodiment, a subscription check is performed to ensure that the client device 102 has rights to view the content. The session manager 204 performs steps 314 and 324 in parallel. In step 324, the session manager 204 checks to see if the client device 102 subscriber SLA information is already known. Under normal circumstances, the subscriber SLA information should be pushed to the session manager 204 when the client device 102 authenticates for access to the carrier network. If the subscriber information does not exist in the session manager 204, a request is sent to the gateway 108, to check the authentication server 110 for the subscriber information.

In step 314, the session manager 204 requests the playlist or manifest file from the cache manager 206, and the cache manager 206 checks to see if the playlist or manifest file already exists in the cache 208. If the playlist of manifest already exists in the cache 208, then the playlist or manifest is returned to the session manager 204 and processing continues to step 318. If the playlist or manifest does not exist in the cache 208, processing continues to step 316 where the cache miss handler 210 retrieves the playlist or manifest file from the content server 112. If necessary, the cache manager 206 performs cache eviction to make room in the cache 208 for the new playlist or manifest file. Once retrieved, the playlist or manifest file is added to the cache 208 and returned to the session manager 204 and processing continues to step 318.

In step 318, the session manager 204 determines whether or not to generate a spoofed playlist based on the rate limiting policies. In one embodiment, only master playlists which specify a plurality of other playlists for different bitrates are spoofed. If the bitrates in the playlist do not exceed the rate limits and a spoofed playlist is not to be generated, processing continues to step 322 where the actual playlist or manifest is returned to the client device 102. If rate limiting is required and the proxy cache 106 would like to hide the actual available bitrates from the client device 102, then a spoofed playlist needs to be generated and processing continues to step 320 where the playlist generator 216 creates a spoofed playlist. In one embodiment, a single bitrate playlist is generated which contains a list of segments similar to those in the actual playlist, but with naming changes to make subsequent segment requests easily recognizable by the proxy cache 106. In another embodiment, the bitrates which exceed the global or subscriber rate limits are removed from the actual playlist. In another embodiment, the order of the remaining bitrates is changed so that the optimal bitrate will be played first by the client. Once the spoof playlist has been generated, processing continues to step 322 where the spoofed playlist is returned to the client device 102.

In step 334, the session manager 204 applies the current bitrate adaptation policies to the segment. Global policies may change over time and subscriber bandwidth limits may be exceeded at different points in time. The subscriber's bandwidth allocation for the client device 102 is reevaluated on each segment request. The session manager 204 selects a target bitrate and proceeds to step 336 where the segment is requested from the cache manager 206. In one embodiment, the target bitrate is only valid if the video resolution of that bitrate encoding does not exceed a maximum resolution as set by the global or subscriber policies. If the segment for the target bitrate already exists in the cache 208, then the segment is returned to the session manager 204 and processing continues to step 340. In one embodiment, if a corresponding segment at a different bitrate is available, then that segment is returned to the session manager 204 and processing continues to step 340. If the no suitable segments exist in the cache 208, processing continues to step 338 where the cache miss handler 210 retrieves the content from the content server 112. If necessary, the cache manager 206 performs cache eviction to make room in the cache 208 for the new content. Once retrieved, the content is added to the cache 208 and returned to the session manager 204 and processing continues to step 340.

In step 340, the segment is returned to the client device 102. In one embodiment, the session manager 204 adds custom HTTP response headers to indicate to downstream networking devices the bandwidth necessary to deliver the segment. The bandwidth needed depends on the video quality parameters such as encoding bitrate, resolution, frame rate as well as complexity of the image sequence. In one embodiment, the session manager 204 adds custom HTTP response headers to indicate to the client device 102 the current network conditions. In one embodiment, the session manager 204 adds customer HTTP response headers to indicate to the client device 102 that client playout rate reduction should be enacted. Processing continues to step 342 where the session manager 204 checks with the cache manager 206 to see if the next sequential segments exist in the cache 208. If the segments exist in the cache 208, then processing ends. If the segments do not exist in the cache 208, then processing proceeds to step 344 where the next sequential segments are prefetched. In one embodiment, only segments for the target bitrate are prefetched. In another embodiment, segments for the target bitrate, one bitrate higher, and one bitrate lower are all prefetched. In another embodiment, the lowest possible bitrate is always prefetched.

In step 326, the session manager 204 creates a simple 5-tuple flow for the non-video content request, then proceeds to step 328 where the session manager 204 requests the content from the cache manager 206. If the content already exists in the cache 208, then the content is returned to the session manager 204 and processing continues to step 332. If the content does not exist in the cache 208, processing continues to step 330 where the cache miss handler 210 retrieves the content from the content server 112. If necessary, the cache manager 206 performs cache eviction to make room in the cache 208 for the new content. Once retrieved, the content is added to the cache 208 and returned to the session manager 204 and processing continues to step 332. In step 332, the content is returned to the client device 102. Persistent HTTP requests may be processed on the same session. The session ends when the TCP connection is torn down.

EXAMPLE

Given a video distributed using HTTP Live Streaming, a master m3u8 file is requested by the client device 102 in step 302. The request is parsed by the session manager 204 in step 304 and determined to be for a playlist in step 308. The session manager 204 then creates a video streaming session in step 312. The master m3u8 playlist is retrieved by the cache manager 206 in steps 314 and 316 and returned to the session manger 204 who parses it and finds contains references to 4 different individual bitrate m3u8 files for 64 kbps, 160 kbps, 320 kbps, and 864 kbps. The session manager finds a global rate limit of 800 kbps and a subscriber rate limit of 700 kbps. The playlist generator 216 generates a spoofed playlist containing only the 3 bitrates: 64 kbps, 160 kbps, and 320 kbps which do not exceed the target bitrate in step 320 and returns it to the client device 102. Subsequent requests for the individual bitrate playlists which are not spoofed and returned directly to the client device 102. The client device 102 then requests the first 160 kbps segment in step 302. The request is parsed by the session manager 204 in step 304 and determined to be for a video segment in step 306. The target bitrate is recalculated in step 334. It is still set at 700 kbps, so the 160 kbps segment is fine and no action is required. The segment is retrieved by the cache manager 206 in steps 336 and 338 and the segment is returned to the client device 102 in step 340. In step 342, the cache manager 206 checks to see if prefetching is needed, if so, it checks if prefetching has been initiated, if not then the cache prefetch handler 212 begins prefetching subsequent 160 kbps segments. The client device 102 then requests the next segment at 320 kbps in step 302. The request is parsed by the session manager 204 in step 304 and determined to be for a video segment in step 306. The target bitrate is recalculated in step 334. It is assumed that the carrier has reset the global rate limit to 300 kbps causing the new target bitrate to be 300 kbps due to network congestion. The 320 kbps segment requested exceeds the target bitrate and the target segment is determined to be the 160 kbps segment. The prefetched 160 kbps segment is retrieved by the cache manager 206 from the cache 208 in step 336, and the segment is returned to the client device 102 in step 340.

Figure 4:
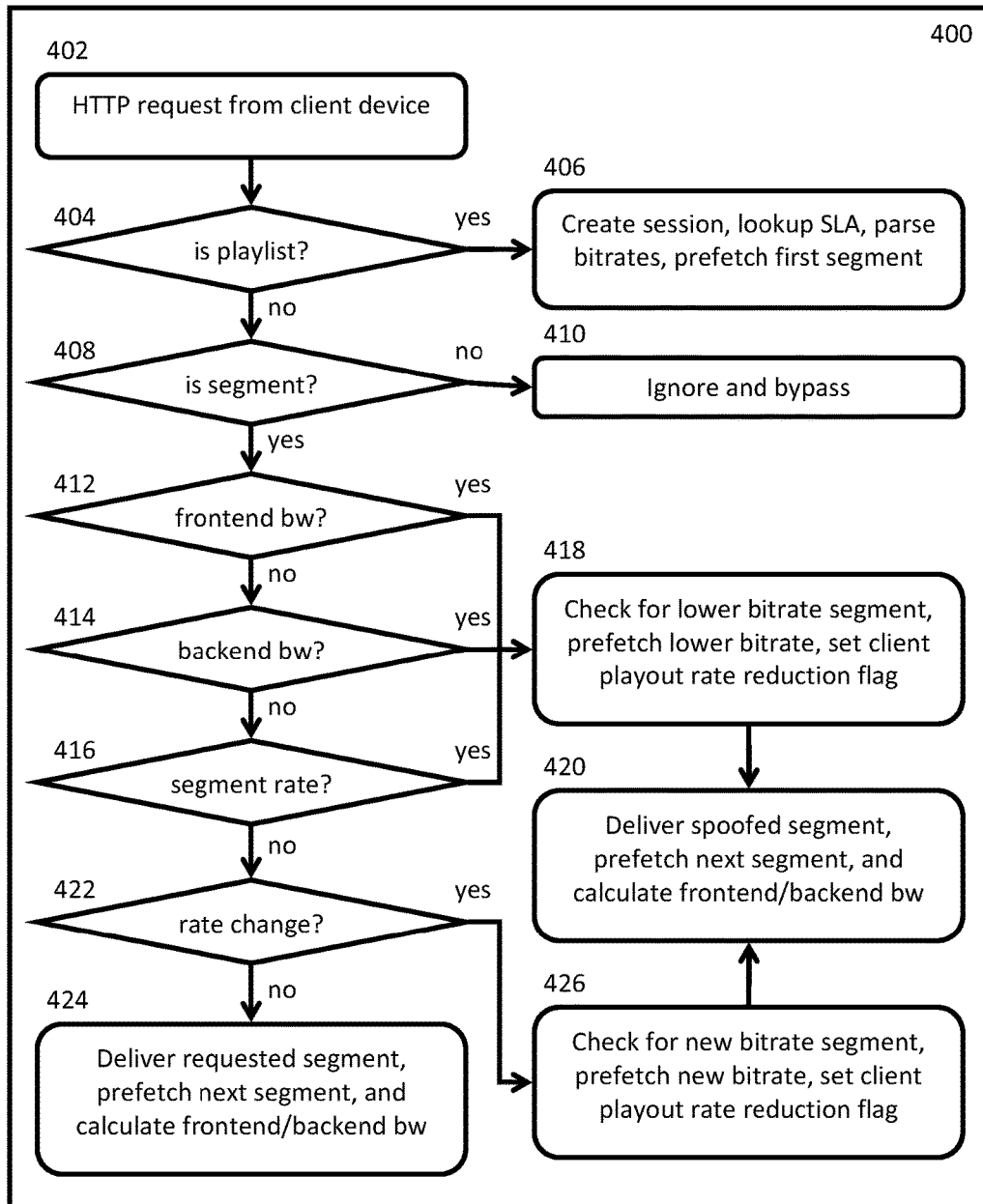
FIG. 4 is a flow chart showing a method for performing carrier controlled rate adaptation and playout rate reduction, in accordance with an embodiment of the present invention.

FIG. 4 is a flow chart 400 describing the process of servicing an HTTP video streaming session in accordance with various embodiments of the present invention. FIG. 4 describes in greater detail, the bandwidth management and session processing performed by the session manager 204, whereas FIG. 3 provides a higher level overview of all the processing components in the proxy cache 106. In step 402, the client device 102 makes an HTTP request for content. The request is received and processed by the HTTP server 202. In step 404, the request is checked to see if it is for a playlist or manifest file. If so, processing proceeds to step 406 where the playlist is retrieved from the cache 208 by the cache manager 206, or a request is forwarded to the content server 112 if the playlist is not already in the cache 208 and the response is parsed. If the playlist is a master playlist containing other individual playlists, all the individual playlists are also retrieved and parsed. In parallel, the subscriber information for the client device 102 is retrieved from the carrier to ascertain the service level of the client device 102. In one embodiment, a platform check is performed to ensure that the client device 102 is a whitelisted or non-blacklisted platform. In one embodiment, a make and model check is performed to ensure that the client device 102 is a whitelisted or non-blacklisted make and model. In one embodiment, a network check is performed to ensure that the client device 102 is connecting through a whitelisted or non-blacklisted network. In one embodiment, a subscription check is performed to ensure that the client device 102 has rights to view the content. A session is created by the session manager 204 mapping the device and the content request to the service level and the parsed playlist/manifest file. The playlist or manifest file contains a list of bitrates and locations for retrieving content. This is used to determine where to prefetch content from.

Upon parsing the playlist/manifest file in step 406, the session manager 204 instructs the cache manager 206 to check the cache 208 for the first segment and if it is not already in the cache 208 to prefetch the first segment in anticipation of the next request from the client device 102. In one embodiment, the first segment prefetched is always prefetched from the highest bitrate. In another embodiment, the first segment prefetched is selected such that it is the highest bitrate which falls below the current bandwidth estimate, in order to provide optimal network utilization. In another embodiment, the first segment prefetched is always prefetched from the lowest (non-audio only) bitrate, to minimize retrieval and playback latency. The playlist generator 216 then creates the spoofed playlist. In one embodiment, the playlist/manifest is modified to remove bitrates which exceed global rate limiting thresholds. In another embodiment, the playlist/manifest is modified to remove bitrates which exceed the subscriber SLA rate limiting thresholds for the client device 102. In one embodiment, the playlist/manifest is modified to remove bitrates whose video resolution exceed a maximum resolution as set by the global or subscriber policies. In another embodiment, the order of the remaining bitrates is changed so that the lowest, non-audio-only bitrate will be played first by the client. In another embodiment, the order of the remaining bitrates is changed so that the highest bitrate will be played first by the client. In another embodiment, the order of the remaining bitrates is changed so that the highest bitrate which falls below the current bandwidth estimate will be played first by the client. Once the session is created, the spoofed playlist/manifest is delivered to the client device 102. Because the returned playlist/manifest may differ from the actual playlist/manifest that was requested, the transparent insertion of an alternate playlist/manifest is referred to as spoofing the playlist.

If the request is not for a playlist or manifest file, processing proceeds to step 408 where the request is checked to see if it is for a video file segment. If the request is not for a file segment, processing proceeds to step 410, where the request is proxied to its destination and no further session processing is performed. If the request is for a file segment, processing proceeds to steps 412 and 414, where the frontend and backend bandwidth thresholds are checked, respectively, and step 416, where the segment bandwidth requirement is checked.

The bandwidth monitor 218 (FIG. 2) tracks bandwidth measurements for the proxy cache 106. In one embodiment, all network traffic between the base station 104 and the gateway 108 traverses the proxy cache 106, giving the bandwidth monitor 218 a comprehensive view of the network utilization. In step 412, the bandwidth monitor 218 is checked to get a current estimate of the frontend radio access network 116 bandwidth. In step 414, the bandwidth monitor 218 is checked to get a current estimate of the backend carrier backhaul network 114 bandwidth. If either the frontend bandwidth in step 412 falls below the thresholds set by the carrier for the service level of the requesting client device 102, or the backend bandwidth in step 414 falls below the thresholds set by the carrier for the service level of the requesting client device 102, or the available bandwidth falls below the bitrate of the requested segment in step 416, then processing proceeds to step 418 where bandwidth usage mitigation steps are initiated by the session manager 204. In one embodiment, if the current segment has already been prefetched, then that segment is selected for delivery to the client device 102. In another embodiment, if the file has already been prefetched and the frontend bandwidth is below the threshold, then the session manager 204 instructs the cache manager 206 to check to see if a lower bitrate version of the same segment resides in the cache 208 and that segment is selected for delivery the lower bandwidth version if possible. In one embodiment, prefetching is disabled when congestion occurs so the next segment is not prefetched. In this case, in subsequent requests there may be no segment available in the cache to deliver to the client device 102, and the request must be proxied in real time. In another embodiment, when congestion is detected, the segment to be prefetched is chosen from the lowest bitrate available for the media, to minimize bandwidth usage. In another embodiment, when congestion is detected, the segment to be prefetched is chosen from the highest bitrate that does not exceed the current bandwidth estimate. The client playout rate reduction flag is also set in step 418.

Once the bandwidth usage mitigation actions have been defined, processing proceeds to step 420 where the "spoofed" segment is delivered to the client device 102. The spoofed segment is the segment selected for delivery. Because the selected segment may be of a lower bitrate than the segment that was requested, the transparent insertion of an alternate segment is referred to as spoofing the segment. If a prefetch segment has been identified, its retrieval from the content server 112 is initiated in step 420 as well. In one embodiment, the client is notified to initiate client playout rate reduction by a custom HTTP header in the segment delivery response. The file segment delivery to the client device 102 is monitored by the bandwidth monitor 218 to estimate frontend bandwidth and file segment prefetching from the content server 112 is monitored by the bandwidth monitor 218 to estimate backend bandwidth.

If sufficient bandwidth exists in the checking of steps 412-416, then processing proceeds to step 422 where the segment request is checked to see if a rate change has occurred in the client. If the segment request is for the same bitrate as the previously requested segment, processing proceeds to step 424 where the segment is retrieved from the cache 208 and delivered to the client and prefetching is initiated for the next segment by the session manager 204, through the cache manager 206. In one embodiment, the segment prefetched is for the same bitrate as the current segment being requested. In another embodiment, the segment prefetched is chosen from the highest bitrate that does not exceed the current bandwidth. The file segment delivery to the client device 102 is monitored by the bandwidth monitor 218 to estimate frontend bandwidth and file segment prefetching from the content server 112 is monitored to estimate backend bandwidth.

If the segment request in step 422 is for a different bitrate than the previously requested segment, processing proceeds to step 426 where the session manager 204 instructs the cache manager 206 to check to see if the new bitrate version of the segment is in the cache 208. In one embodiment, if the new bitrate version is not found, the already prefetched segment is delivered to the client. In another embodiment, if the new bitrate version is not found, the client request must be proxied in real time. In one embodiment, the segment prefetched is for the new bitrate. In another embodiment, the segment prefetched is chosen from the highest bitrate that does not exceed the current bandwidth. In one embodiment, if the segment was not found in the cache 208, the client playout rate reduction flag is set in step 426, to provide more time for prefetching. In another embodiment, if the segment requested is for a lower bitrate than the previously requested segment, the client playout rate reduction flag is set in step 426, to further reduce load on the network. Once the rate adaptation actions have been defined, processing proceeds to step 420, where the selected segment is delivered to the client device 102, and the session manager 204 instructs the cache manager 206 to prefetch the next segment from the content server 112. In one embodiment, the client is notified to initiate client playout rate reduction by a custom HTTP header in the segment delivery response. The file segment delivery to the client device 102 is monitored by the bandwidth monitor 218 to estimate frontend bandwidth and file segment prefetching from the content server 112 is monitored by the bandwidth monitor 218 to estimate backend bandwidth.

Figure 5:
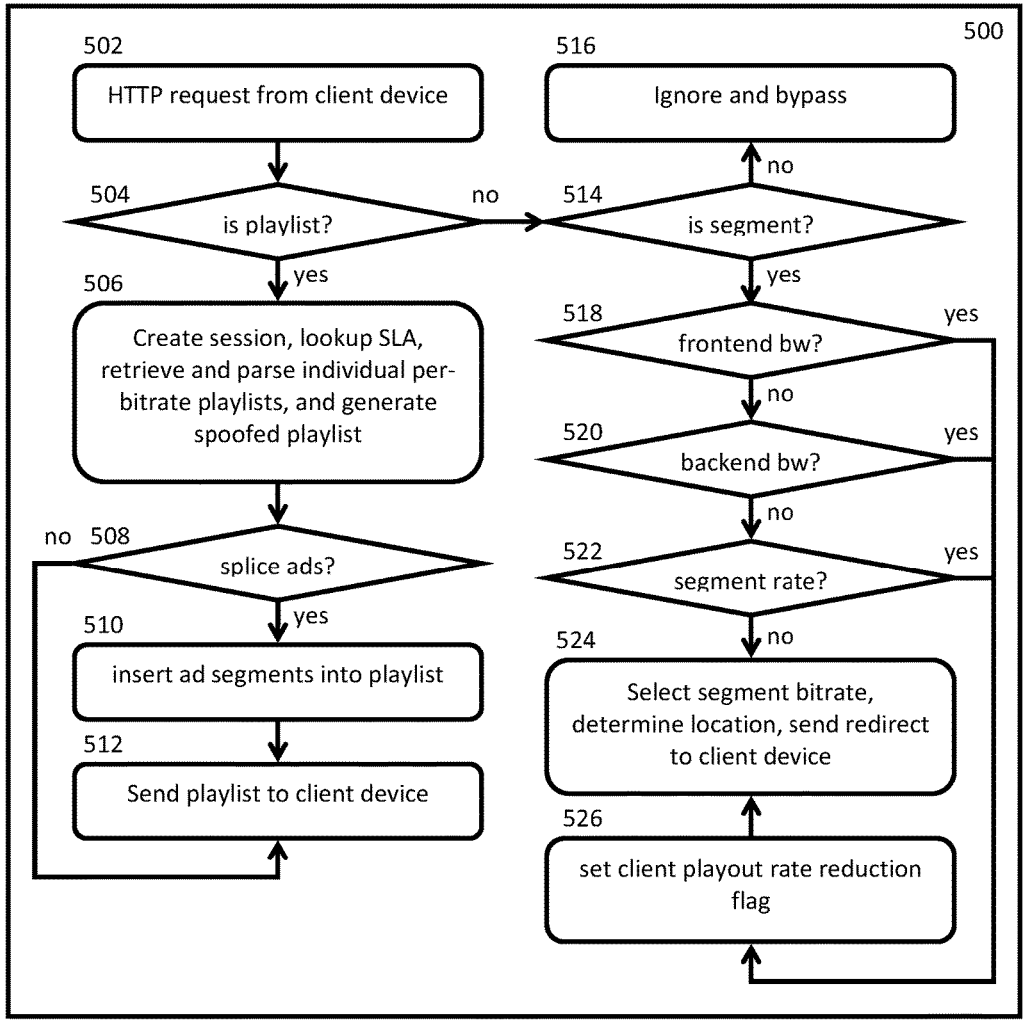
FIG. 5 is a flow chart showing a method for performing carrier controlled rate adaptation and playout rate reduction using redirects, in accordance with an embodiment of the present invention.

FIG. 5 is a flow chart 500 describing the process of servicing an HTTP video streaming session in accordance with various embodiments of the present invention. FIG. 5 describes the method of using HTTP redirects in lieu of local caching for segment delivery in support of carrier controlled rate adaptation and client playout rate reduction. In step 502, the client device 102 makes an HTTP request for content. The request is received and processed by the HTTP server 202. In step 504, the request is checked to see if it is for a playlist or manifest file. If so, processing proceeds to step 506. If not, processing proceeds to step 514 where segment request checks are performed.

In step 506, the playlist is retrieved from the cache 208 by the cache manager 206, or a request is forwarded to the content server 112 if the playlist is not already in the cache 208 and the response is parsed. If the playlist is a master playlist containing other individual playlists, all the individual playlists are also retrieved and parsed. In one embodiment, though segments may not be cached, playlist files are still cached in the cache 208. In parallel, the subscriber information for the client device 102 is retrieved from the carrier to ascertain the service level of the client device 102. In one embodiment, a platform check is performed to ensure that the client device 102 is a whitelisted or non-blacklisted platform. In one embodiment, a make and model check is performed to ensure that the client device 102 is a whitelisted or non-blacklisted make and model. In one embodiment, a network check is performed to ensure that the client device 102 is connecting through a whitelisted or non-blacklisted network. In one embodiment, a subscription check is performed to ensure that the client device 102 has rights to view the content. A session is created by the session manager 204 mapping the device and the content request to the service level and the parsed playlist/manifest file. The playlists are parsed to determine the number of bitrates available, and the number of segments associated with the content. Using this information a "spoofed" playlist is generated by the playlist generator 216. The spoofed playlist contains a single bitrate with the segment locations point back to the proxy cache 106. This ensures that all segment requests will still traverse the proxy cache 106. The segment locations in the playlist do not indicate specific bitrate; the bitrate will be chosen dynamically when the segment is requested. In one embodiment, the segment locations identify the local session id to simplify session lookup for the session manger 204. Because the playlist returned to the client device 102 is not the playlist it requested, the transparent insertion of the single bitrate playlist is referred to as spoofing the playlist. In one embodiment, each segment is marked as being discontinuous. Because each segment may be of a different bitrate or frame rate or resolution, the discontinuity indication is needed by certain media players in order to provide the highest quality playback.

Once the initial spoofed playlist is created, processing proceeds to step 508 where a check is done to see if any stream splicing is necessary. If stream splicing is desired, processing proceeds to step 510 where segment splicing occurs. In one embodiment, additional segments are added to the playlist to allow for ad insertion. In another embodiment, mappings are generated for switching between different streams at specific segment boundaries. In one embodiment, spliced segments are marked as being discontinuous. Because each segment may be from a different video stream, the discontinuity indication is needed by certain media players (for rectifying time boundaries and relative video references) in order to provide the highest quality playback. Once stream splicing is complete, or if no stream splicing was required in step 508, processing proceeds to step 512. In step 512, the spoofed playlist is returned to the client device 102.

In step 514, if the request was not for a playlist or manifest file in step 504, the request is checked to see if it is for a video file segment. Specifically, the request is checked to see if the location is of a specific format which would indicate it is from a spoofed playlist for an existing session. If the request is not for a file segment, processing proceeds to step 516, where the request is proxied to its destination and no further session processing is performed. If the request is for a file segment, the session manager 204 looks up the session and processing proceeds to steps 518 and 520, where the frontend and backend bandwidth thresholds are checked, respectively, and step 522, where the segment bandwidth requirement is checked.

The bandwidth monitor 218 tracks bandwidth measurements for the proxy cache 106. In one embodiment, all network traffic between the base station 104 and the gateway 108 traverses the proxy cache 106, giving the bandwidth monitor 218 a comprehensive view of the network utilization. In step 518, the bandwidth monitor 218 is checked to get a current estimate of the frontend radio access network 116 bandwidth. In step 520, the bandwidth monitor 218 is checked to get a current estimate of the backend carrier backhaul network 114 bandwidth. If either the frontend bandwidth in step 518 falls below the thresholds set by the carrier for the service level of the requesting client device 102, or the backend bandwidth in step 520 falls below the thresholds set by the carrier for the service level of the requesting client device 102, or the available bandwidth falls below the bitrate of the requested segment in step 522, then processing proceeds to step 526 where bandwidth usage mitigation steps are initiated by the session manager 204. If no bandwidth mitigation steps were required in steps 518, 520, or 522, then processing proceeds directly to step 524. In step 526, the client playout rate reduction flag is set and processing proceeds to step 524.

In step 524, the session manager 204 uses the current bandwidth estimates to select the target bitrate segment for the client device 102. In one embodiment, the segment bitrate is chosen as the highest bitrate that does not exceed the current bandwidth, the global bandwidth limits, or the client SLA bandwidth limits. In one embodiment, the target bitrate is only valid if the video resolution of that bitrate encoding does not exceed a maximum resolution as set by the global or subscriber policies. The session manager 204 finds the actual source location of the segment (as determined from the original playlist parsed in step 506) and instructs the HTTP server 202 to return an HTTP redirect to the client device 102, redirecting the segment request to the location of the "spoofed" segment. The spoofed segment is the segment selected for delivery. Because the client device 102 is unaware of and has no influence over the segment selection process, the transparent insertion of the selected segment is referred to as spoofing the segment. In one embodiment, the client is notified to initiate client playout rate reduction by a custom HTTP header in the segment delivery response.

Although the above description includes numerous specifics in the interest of a fully enabling teaching, it will be appreciated that the present invention can be realized in a variety of other manners and encompasses all implementations falling within the scope of the claims herein.

What is claimed is:

1. A method for operating a proxy computer in a streaming video delivery network to enforce video streaming policies for clients using bitrate adaptation and video playout rate reduction, comprising:
   performing video streaming by caching video segments from a video content server and delivering cached video segments to the clients, the caching including predictively prefetching future video segments;
   monitoring a variety of operational information;
   using the operational information to calculate desired operational parameters for the network including a target bitrate for delivery of the video segments and an optimal bitrate for prefetching video segments; and
   notifying a client of network conditions and the need for modification of the playout rate at which the video segments are to be rendered at the client to obtain a desired mix of quality playback and conformance to the desired operational parameters of the network.

2. The method of claim 1, wherein the variety of operation information includes subscriber service level agreement (SLA) information, local network bandwidth at the proxy computer, and presence of congestion in the network.

3. The method of claim 2, further comprising one or more actions selected from the group consisting of limiting access to selected videos; limiting bandwidth usage; applying global rate limiting policies; and prioritizing bandwidth by service level.

4. The method of claim 3, wherein limiting access to selected videos includes refraining from sending videos of a given bitrate and/or resolution to clients not capable of rendering the videos at the given bitrate and/or resolution.

5. The method of claim 3, wherein limiting access to selected videos is based on licensing restrictions regarding maximum bitrate or resolution available to a given client.

6. The method of claim 3, wherein limiting bandwidth usage is achieved by using segment spoofing and/or playlist spoofing, segment spoofing including requesting a segment for one bitrate from the video content server in response to receiving a request for a segment of a higher bitrate from a client, and playlist spoofing including sending a spoofed playlist to the client in response to receiving a requested playlist, the spoofed playlist differing from the requested playlist.

7. The method of claim 1, wherein segments are prefetched sequentially based on a current segment being requested, and prefetched segments are cached for later delivery to the clients.

8. The method of claim 1, wherein the network includes a frontend radio access network and a backend carrier backhaul network, and wherein bandwidth of the frontend radio access network is estimated separately from bandwidth of the backend carrier backhaul network.

9. The method of claim 1, wherein notifying the client of network conditions includes providing a frontend network bandwidth estimate usable by the client and routers downstream of the proxy computer, and wherein notifying the client of network conditions includes using a custom HTTP header inserted into a response to an HTTP request.

10. The method of claim 1, wherein notifying the client of network conditions includes providing a backend network bandwidth estimate usable by the client and routers downstream of the proxy computer, the notifying including using a custom HTTP header inserted into a response to an HTTP request.

11. A proxy computer for use in a streaming video delivery network to enforce video streaming policies for clients using bitrate adaptation and video playout rate reduction, comprising:
    memory;
    a processor;
    input/output circuitry for connecting the proxy computer to the streaming video delivery network including connections to the clients and a video content server; and
    one or more data buses by which the memory, processor and input/output circuitry are coupled together,
    the memory and processor being configured to store and execute program instructions to enable the proxy computer to perform a method including:
       performing video streaming by caching video segments from a video content server and delivering cached video segments to the clients, the caching including predictively prefetching future video segments;
       monitoring a variety of operational information;
       using the operational information to calculate desired operational parameters for the network including a target bitrate for delivery of the video segments and an optimal bitrate for prefetching video segments; and
       notifying a client of network conditions and the need for modification of the playout rate at which the video segments are to be rendered at the client to obtain a desired mix of quality playback and conformance to the desired operational parameters of the network.

12. The proxy computer according to claim 11, wherein the variety of operation information includes subscriber service level agreement (SLA) information, local network bandwidth at the proxy computer, and presence of congestion in the network.

13. The proxy computer according to claim 12, further comprising one or more actions selected from the group consisting of limiting access to selected videos; limiting bandwidth usage; applying global rate limiting policies; and prioritizing bandwidth by service level.

14. The proxy computer according to claim 13, wherein limiting access to selected videos includes refraining from sending videos of a given bitrate and/or resolution to clients not capable of rendering the videos at the given bitrate and/or resolution.

15. The proxy computer according to claim 13, wherein limiting access to selected videos is based on licensing restrictions regarding maximum bitrate or resolution available to a given client.

16. The proxy computer according to claim 13, wherein limiting bandwidth usage is achieved by using segment spoofing and/or playlist spoofing, segment spoofing including requesting a segment for one bitrate from the video content server in response to receiving a request for a segment of a higher bitrate from a client, and playlist spoofing including sending a spoofed playlist to the client in response to receiving a requested playlist, the spoofed playlist differing from the requested playlist.

17. The proxy computer according to claim 11, wherein segments are prefetched sequentially based on a current segment being requested, and prefetched segments are cached for later delivery to the clients.

18. The proxy computer according to claim 11, wherein the network includes a frontend radio access network and a backend carrier backhaul network, and wherein bandwidth of the frontend radio access network is estimated separately from bandwidth of the backend carrier backhaul network.

19. The proxy computer according to claim 11, wherein notifying the client of network conditions includes providing a frontend network bandwidth estimate usable by the client and routers downstream of the proxy computer, and wherein notifying the client of network conditions includes using a custom HTTP header inserted into a response to an HTTP request.

20. The proxy computer according to claim 11, wherein notifying the client of network conditions includes providing a backend network bandwidth estimate usable by the client and routers downstream of the proxy computer, the notifying including using a custom HTTP header inserted into a response to an HTTP request.

* * * * *